US009325911B2

(12) United States Patent  
Negishi

(10) Patent No.: US 9,325,911 B2  
(45) Date of Patent: Apr. 26, 2016

(54) IMAGE CAPTURING APPARATUS AND METHOD OF CONTROLLING THE SAME

(71) Applicant: CANON KABUSHIKI KAISHA, Tokyo (JP)

(72) Inventor: Norio Negishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/451,740

(22) Filed: Aug. 5, 2014

(65) Prior Publication Data

US 2015/0042849 A1 Feb. 12, 2015

(30) Foreign Application Priority Data

Aug. 8, 2013 (JP) ................................. 2013-165587

(51) Int. Cl.
| | |
|---|---|
| *H04N 5/235* | (2006.01) |
| *H04N 5/357* | (2011.01) |
| *H04N 5/361* | (2011.01) |
| *H04N 5/217* | (2011.01) |
| *H04N 5/232* | (2006.01) |
| *H04N 1/21* | (2006.01) |

(52) U.S. Cl.
CPC ............ *H04N 5/2356* (2013.01); *H04N 1/215* (2013.01); *H04N 5/2175* (2013.01); *H04N 5/232* (2013.01); *H04N 5/357* (2013.01); *H04N 5/361* (2013.01)

(58) Field of Classification Search
CPC ... H04N 5/2175; H04N 5/2176; H04N 5/357; H04N 5/23566; H04N 1/215; H04N 2201/3247; H04N 5/361; H04N 5/2356

USPC .................................. 348/241, 243, 246, 251  
See application file for complete search history.

(56) References Cited

U.S. PATENT DOCUMENTS

| | | | | |
|---|---|---|---|---|
| 6,710,807 | B1 * | 3/2004 | Yamagishi | H04N 5/361 348/221.1 |
| 6,982,757 | B2 * | 1/2006 | Tariki | H04N 5/2176 348/222.1 |
| 2003/0128285 | A1 * | 7/2003 | Itoh | H04N 5/367 348/246 |
| 2006/0082675 | A1 * | 4/2006 | McGarvey | H04N 3/1568 348/362 |

FOREIGN PATENT DOCUMENTS

JP 64-039171 A 2/1989

\* cited by examiner

*Primary Examiner* — Nhan T Tran  
(74) *Attorney, Agent, or Firm* — Cowan, Liebowitz & Latman, P.C.

(57) ABSTRACT

An image capturing apparatus includes an image sensor, a shutter, a composition unit configured to perform continuous shooting of a plurality of exposure images by the image sensor and compose the plurality of images, a driving unit configured to drive the shutter and the image sensor to capture a first black image before the continuous shooting while the image sensor is shielded from light and to capture a second black image after the continuous shooting while the image sensor is shielded from light, and an image processing unit configured to perform first noise reduction processing using the first black image and second noise reduction processing using the second black image for each of a plurality of images obtained by the continuous shooting or an image obtained by composing the plurality of images.

13 Claims, 13 Drawing Sheets

FIG. 5

| Tv<1/30s | 0~10°C | 10~20°C | 20~30°C | 30~40°C | 40~50°C |
|---|---|---|---|---|---|
| ISO100 ~ISO400 | 0 | 0 | 0 | 0 | 0 |
| ISO400 ~ISO1600 | 0 | 0 | 0 | 0 | 0 |
| ISO1600 ~ISO6400 | 0 | 0 | 0 | 0 | 1 |
| ISO6400~ | 0 | 0 | 0 | 1 | 1 |

| 1/30s≤Tv<1s | 0~10°C | 10~20°C | 20~30°C | 30~40°C | 40~50°C |
|---|---|---|---|---|---|
| ISO100 ~ISO400 | 0 | 0 | 0 | 0 | 1 |
| ISO400 ~ISO1600 | 0 | 0 | 0 | 0 | 1 |
| ISO1600 ~ISO6400 | 0 | 0 | 1 | 1 | 1 |
| ISO6400~ | 1 | 1 | 1 | 1 | 1 |

| 1s≤Tv | 0~10°C | 10~20°C | 20~30°C | 30~40°C | 40~50°C |
|---|---|---|---|---|---|
| ISO100 ~ISO400 | 1 | 1 | 1 | 1 | 1 |
| ISO400 ~ISO1600 | 1 | 1 | 1 | 1 | 1 |
| ISO1600 ~ISO6400 | 1 | 1 | 1 | 1 | 1 |
| ISO6400~ | 1 | 1 | 1 | 1 | 1 |

FIG. 8

| Tv<1/30s | ΔT<5°C | 5°C≤ΔT |
|---|---|---|
| ISO100 ~ISO400 | 0 | 1 |
| ISO400 ~ISO1600 | 0 | 1 |
| ISO1600 ~ISO6400 | 0 | 1 |
| ISO6400~ | 0 | 1 |

| 1/30s≤Tv<1s | ΔT<5°C | 5°C≤ΔT |
|---|---|---|
| ISO100 ~ISO400 | 0 | 1 |
| ISO400 ~ISO1600 | 0 | 1 |
| ISO1600 ~ISO6400 | 0 | 1 |
| ISO6400~ | 0 | 1 |

| 1s≤Tv | ΔT<5°C | 5°C≤ΔT |
|---|---|---|
| ISO100 ~ISO400 | 1 | 1 |
| ISO400 ~ISO1600 | 1 | 1 |
| ISO1600 ~ISO6400 | 1 | 1 |
| ISO6400~ | 1 | 1 |

IMAGE CAPTURING APPARATUS AND METHOD OF CONTROLLING THE SAME

BACKGROUND OF THE INVENTION

1. Field of the Invention

The present invention relates to an image capturing apparatus including an image sensor.

2. Description of the Related Art

In an image capturing apparatus including an image sensor, as the exposure time prolongs and the temperature of the image sensor rises, dark current components increase in the image sensor to generate defective pixels, resulting in flaws, dark shading, and the like, which are superimposed as fixed pattern noise components on an output image. Such noise components become factors that cause deterioration in image quality. In general, it is possible to remove these fixed pattern noise components by performing the black subtraction processing of subtracting a black image (light-shielding image) captured under the same conditions as those for an actual exposure image from the actual exposure image.

According to Japanese Patent Laid-Open No. 1-39171, a dark time output signal corresponding to fixed pattern noise which an image sensor has is recorded in a memory in advance. When an object is shot, the above dark time output signal is read out from the memory and subtracted from the captured image, thereby performing fixed pattern noise correction.

Consider a case in which as shown in FIG. 12, stars moving in the night sky are continuously shot, and obtained actual exposure images are composed to generate a star trail image depicting star trails in the starlit sky in one picture. Since the night sky and stars as objects are low in illuminance at this time, it is necessary to set a sufficiently long actual exposure time (about several min to several ten min) in the image capturing apparatus. In addition, in order to compose actual exposure images as star trail images, it is necessary to continuously shoot the stars and compose images of the stars, which move from moment to moment, for a long period of time. Stars in the night sky move around the North Star through 15° per hour. Although it depends on the shooting direction and the lengths of trails to be shot, in order to record a shot picture as a star trail image, it is generally necessary to perform continuous shooting for several ten min to several hrs.

If, however, a long exposure time is set in the above manner, fixed pattern noise, such as flaws and dark shading, tends to occur. In addition, shooting for a long period of time will raise the temperature of the image sensor every second, and hence fixed pattern noise tends to occur accordingly. For this reason, in order to obtain a high-quality image as a star trail image like that described above, it is indispensable to perform fixed pattern noise correction.

It is normally preferable to remove fixed pattern noise by capturing black images before and after the shooting time of an actual exposure image, that is, under a condition in which the temperature of the image sensor hardly changes, and performing black subtraction processing for each actual exposure image. However, this processing makes it impossible to record the movement of stars during shooting for black images, and hence the star trail image obtained by composition becomes discrete, as shown in FIG. 13.

SUMMARY OF THE INVENTION

The present invention has been made in consideration of the above problem, and provides an image capturing apparatus which can generate a high-quality image with little fixed pattern noise even when continuously shooting and composing long exposure images like star trail images.

According to the first aspect of the present invention, there is provided an image capturing apparatus comprising: an image sensor including a plurality of pixels arranged two-dimensionally; a light-shielding unit configured to shield the image sensor from light; a composition unit configured to perform continuous shooting of a plurality of exposure images by the image sensor and compose the plurality of exposure images obtained by the continuous shooting; a control unit configured to perform control to acquire a first black image before the continuous shooting by causing the image sensor to accumulate electric charges while the image sensor is shielded from light by the light-shielding unit and to acquire a second black image after the continuous shooting by causing the image sensor to accumulate electric charges while the image sensor is shielded from light by the light-shielding unit; and an image processing unit configured to perform first noise reduction processing using the first black image and second noise reduction processing using the second black image for each of a plurality of exposure images obtained by the continuous shooting or an exposure image obtained by composing the plurality of exposure images by the composition unit.

According to the second aspect of the present invention, there is provided an image capturing apparatus comprising: an image sensor including a plurality of pixels arranged two-dimensionally; a light-shielding unit configured to shield the image sensor from light; a composition unit configured to perform continuous shooting of a plurality of exposure images by the image sensor and compose the plurality of exposure images obtained by the continuous shooting; a control unit configured to perform control to acquire a first black image before the continuous shooting by causing the image sensor to accumulate electric charges while the image sensor is shielded from light by the light-shielding unit and to acquire a second black image after the continuous shooting by causing the image sensor to accumulate electric charges while the image sensor is shielded from light by the light-shielding unit; and an image processing unit configured to perform noise reduction processing using the first black image and the second black image for each of a plurality of exposure images obtained by the continuous shooting or an exposure image obtained by composing the plurality of exposure images by the composition unit.

According to the third aspect of the present invention, there is provided an image capturing apparatus comprising: an image sensor including a plurality of pixels arranged two-dimensionally; a light-shielding unit configured to shield the image sensor from light; a control unit configured to perform control to acquire a first black image before the exposure image shooting by the image sensor by causing the image sensor to accumulate electric charges while the image sensor is shielded from light by the light-shielding unit and to acquire a second black image after the exposure image shooting by causing the image sensor to accumulate electric charges while the image sensor is shielded from light by the light-shielding unit; and an image processing unit configured to perform first noise reduction processing using the first black image and second noise reduction processing using the second black image for the exposure image.

According to the fourth aspect of the present invention, there is provided an image capturing apparatus comprising: an image sensor including a plurality of pixels arranged two-dimensionally; a light-shielding unit configured to shield the image sensor from light; a control unit configured to perform control to acquire a first black image before the exposure image shooting by the image sensor by causing the image sensor to accumulate electric charges while the image sensor is shielded from light by the light-shielding unit and to acquire a second black image after the exposure image shooting by causing the image sensor to accumulate electric charges while the image sensor is shielded from light by the light-shielding unit; and an image processing unit configured to perform noise reduction processing using the first black image and the second black image for the exposure image.

According to the fifth aspect of the present invention, there is provided a method of controlling an image capturing apparatus including an image sensor including a plurality of pixels arranged two-dimensionally and a light-shielding unit configured to shield the image sensor from light, the method comprising: a composition step of performing continuous shooting of a plurality of exposure images by the image sensor and composing the plurality of exposure images obtained by the continuous shooting; a control step of performing control to acquire a first black image before the continuous shooting by causing the image sensor to accumulate electric charges while the image sensor is shielded from light by the light-shielding unit and to acquire a second black image after the continuous shooting by causing the image sensor to accumulate electric charges while the image sensor is shielded from light by the light-shielding unit; and an image processing step of performing first noise reduction processing using the first black image and second noise reduction processing using the second black image for each of a plurality of exposure images obtained by the continuous shooting or an exposure image obtained by composing the plurality of exposure images in the composition step.

According to the sixth aspect of the present invention, there is provided a method of controlling an image capturing apparatus including an image sensor including a plurality of pixels arranged two-dimensionally and a light-shielding unit configured to shield the image sensor from light, the method comprising: a composition step of performing continuous shooting of a plurality of exposure images by the image sensor and composing the plurality of exposure images obtained by the continuous shooting; a control step of performing control to acquire a first black image before the continuous shooting by causing the image sensor to accumulate electric charges while the image sensor is shielded from light by the light-shielding unit and to acquire a second black image after the continuous shooting by causing the image sensor to accumulate electric charges while the image sensor is shielded from light by the light-shielding unit; and an image processing step of performing noise reduction processing using the first black image and the second black image for each of a plurality of exposure images obtained by the continuous shooting or an exposure image obtained by composing the plurality of exposure images in the composition step.

According to the seventh aspect of the present invention, there is provided a method of controlling an image capturing apparatus including an image sensor including a plurality of pixels arranged two-dimensionally and a light-shielding unit configured to shield the image sensor from light, the method comprising: a control step of performing control to acquire a first black image before the exposure image shooting by the image sensor by causing the image sensor to accumulate electric charges while the image sensor is shielded from light by the light-shielding unit and to acquire a second black image after the exposure image shooting by causing the image sensor to accumulate electric charges while the image sensor is shielded from light by the light-shielding unit; and an image processing step of performing first noise reduction processing using the first black image and second noise reduction processing using the second black image for the exposure image.

According to the eighth aspect of the present invention, there is provided a method of controlling an image capturing apparatus including an image sensor including a plurality of pixels arranged two-dimensionally and a light-shielding unit configured to shield the image sensor from light, the method comprising: a control step of performing control to acquire a first black image before the exposure image shooting by the image sensor by causing the image sensor to accumulate electric charges while the image sensor is shielded from light by the light-shielding unit and to acquire a second black image after the exposure image shooting by causing the image sensor to accumulate electric charges while the image sensor is shielded from light by the light-shielding unit; and an image processing step of performing noise reduction processing using the first black image and the second black image for the exposure image.

Further features of the present invention will become apparent from the following description of exemplary embodiments with reference to the attached drawings.

BRIEF DESCRIPTION OF THE DRAWINGS

FIG. 5 is a view showing a reference table to be referred to when performing operation switching according to the first embodiment;

FIG. 8 is a view showing a reference table to be referred to when performing operation switching according to the first embodiment;

DESCRIPTION OF THE EMBODIMENTS

The embodiments of the present invention will be described in detail below with reference to the accompanying drawings.

First Embodiment

The first embodiment of the present invention will be described below with reference to FIGS. 1 to 9. The first embodiment of the present invention will exemplify the star trail mode of sequentially composing star trail images while shooting a starlit sky.

In this embodiment, in order to let the user know the composite state of star trail images, a monitor displays the star trail image having undergone composition processing up to a given time point while a plurality of star trails in the sky are shot. The star trail image obtained by composition as a final output image and images before composition (to be referred to as in-progress starlit sky images hereinafter) obtained by shooting an ever-changing starlit sky are stored.

Figure 1:
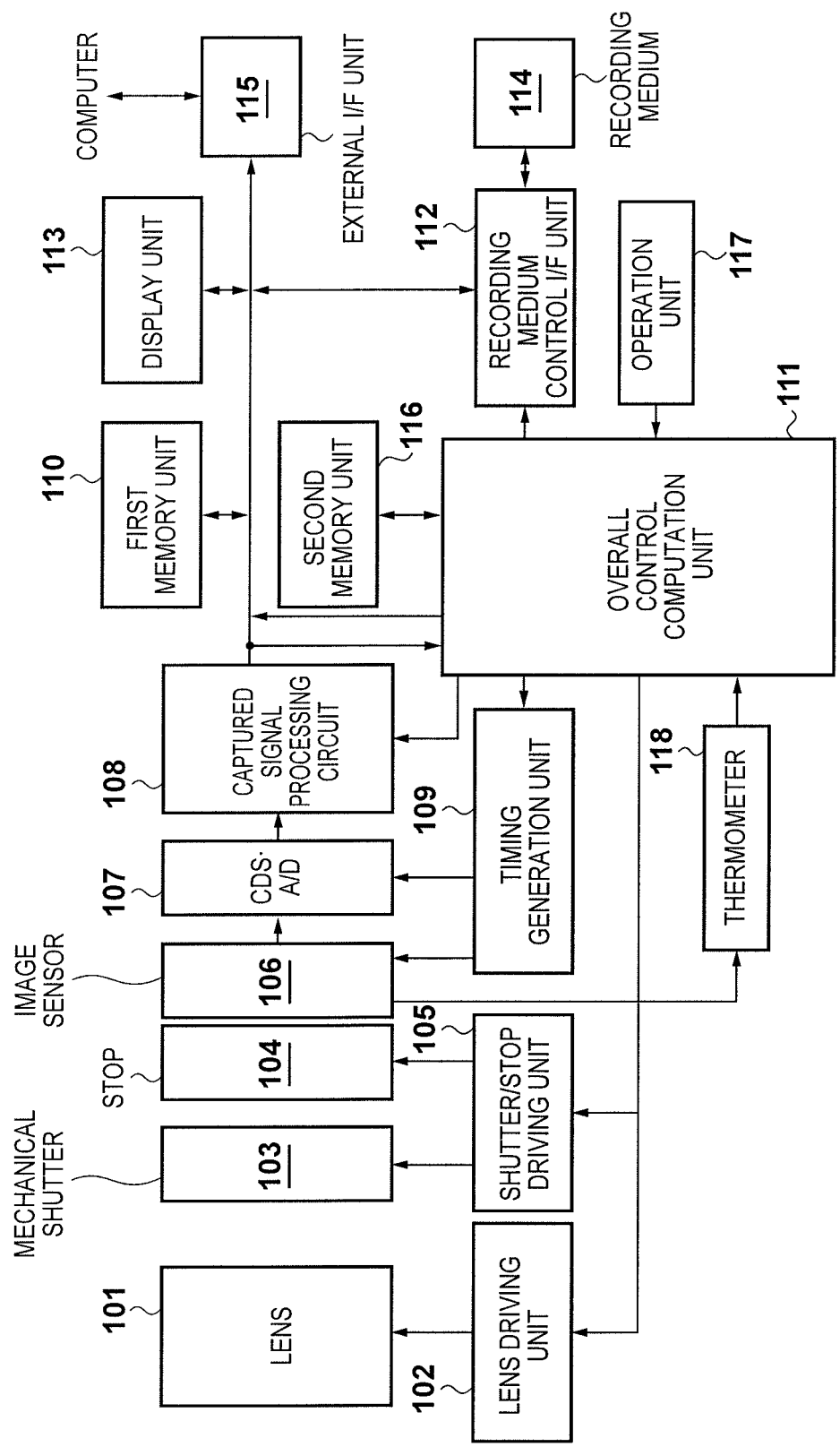
FIG. 1 is a block diagram showing the arrangement of an image capturing apparatus according to the first embodiment of the present invention.

FIG. 1 is a block diagram showing the arrangement of an image capturing apparatus according to this embodiment.

An object image passing through a lens 101 is adjusted to a proper amount of light by a stop 104 and formed into an image on an image sensor 106. The image sensor 106 has photoelectric conversion elements arranged in a two-dimensional matrix of k columns and m rows, with each pixel including one of four color filters, namely a red (R), green (Gr), green (Gb), and blue (B) filters. These four color filters constitute a Bayer arrangement. A circuit (to be referred to as a CDS•A/D hereinafter) 107 designed to perform correlation double sampling, gain adjustment, and A/D conversion performs correlation double sampling, gain adjustment, and A/D conversion of converting an analog signal to a digital signal for the object image formed on the image sensor 106 to capture the image as R, Gr, Gb, and B signals, and sends them to a captured signal processing circuit 108. The captured signal processing circuit 108 performs various types of image signal processing such as low-pass filter processing for noise reduction, shading processing, and WB processing, peak hold processing, various types of correction processing such as flaw correction of correcting flaws caused by defective pixels in the image sensor 106, dark shading correction, and black subtraction processing, image data compression, and the like.

A lens driving unit 102 drives and controls the lens 101 so as to perform zooming, focusing, and the like. A mechanical shutter 103 is a shutter mechanism which mechanically controls the irradiation time of light entering the stop 104 and the image sensor 106 on the subsequent stage. A mechanical shutter/stop driving unit (to be referred to as a shutter/stop driving unit hereinafter) 105 drives and controls the mechanical shutter 103 and the stop 104. A timing generation unit 109 outputs various types of timing signals to the image sensor 106 and the CDS•A/D 107. An overall control computation unit 111 performs overall control and various types of computation for the image capturing apparatus.

A first memory unit 110 temporarily stores image data. A recording medium control interface unit (to be referred to as a recording medium control I/F hereinafter) 112 records or reads out image data in or from a recording medium. A display unit 113 displays image data. A recording medium 114 such as a semiconductor memory is detachable and stores image data. An external interface unit (to be referred to as an external I/F unit hereinafter) 115 is an interface for communicating with an external computer or the like. A second memory unit 116 stores the computation result obtained by the overall control computation unit 111.

Information concerning driving conditions for the image capturing apparatus which are set by the user using an operation unit 117 is sent to the overall control computation unit 111. The overall image capturing apparatus is controlled based on these pieces of information. A thermometer 118 measures the temperature of the image sensor 106 and sends the measured temperature information to the overall control computation unit 111. The overall control computation unit 111 stores the sent temperature information of the image sensor in the second memory unit 116. The thermometer 118 may be formed from a device designed to directly measure temperature information, such as a thermistor or thermocouple, or may be configured to indirectly obtain temperature information from the dark current component of output data from the image sensor 106.

Figure 2:
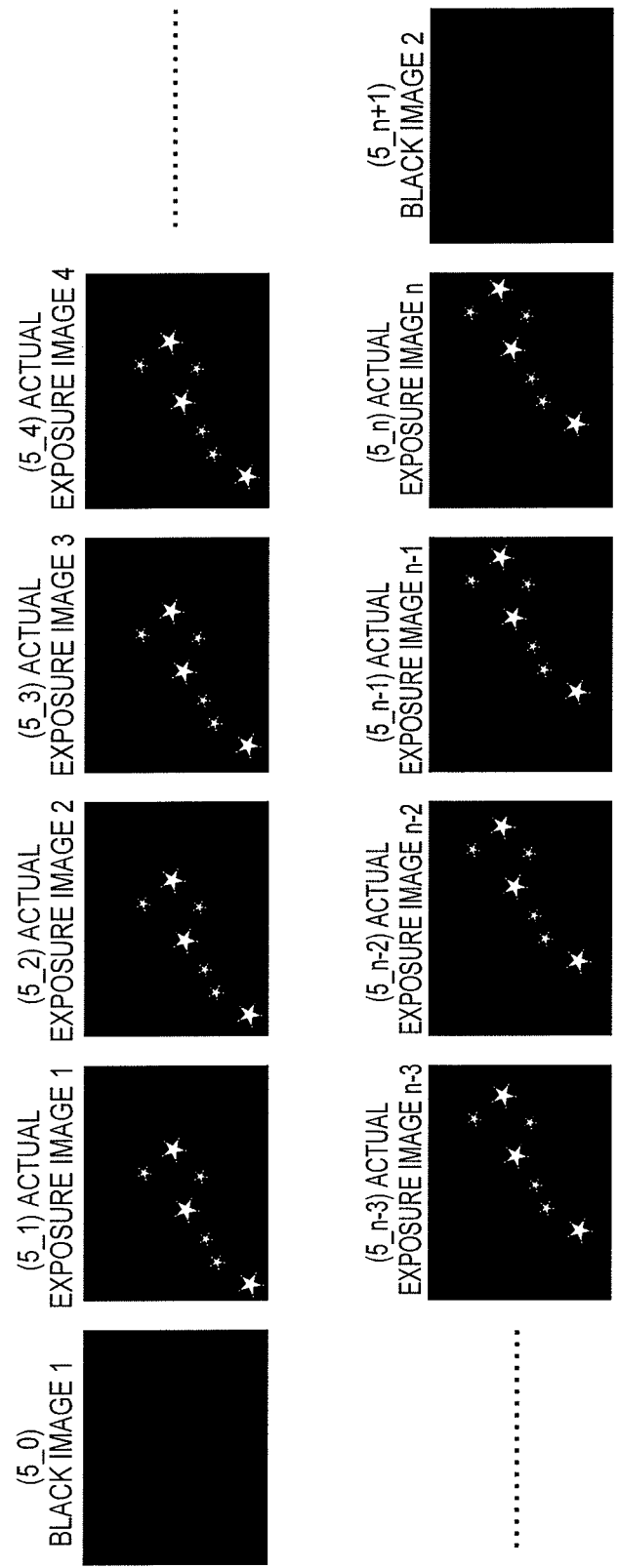
FIG. 2 is a view showing a shooting sequence for an image according to the first embodiment.

An outline of operation in the star trail mode in this embodiment will be described next with reference to FIGS. 2 and 3. FIG. 2 shows the images shot in the star trail mode that are sequentially arranged starting from the image shot first.

First of all, black image 1 is shot before actual exposure by making the image sensor 106 accumulate electric charges in a light-shielded state. Thereafter, actual exposure is started to sequentially and continuously shoot starlit sky images in the order of actual exposure image 1, actual exposure image 2, actual exposure image 3, . . . , actual exposure image n. Finally, black image 2 is shot again while the image sensor 106 is set in a light-shielded state.

Figure 3:
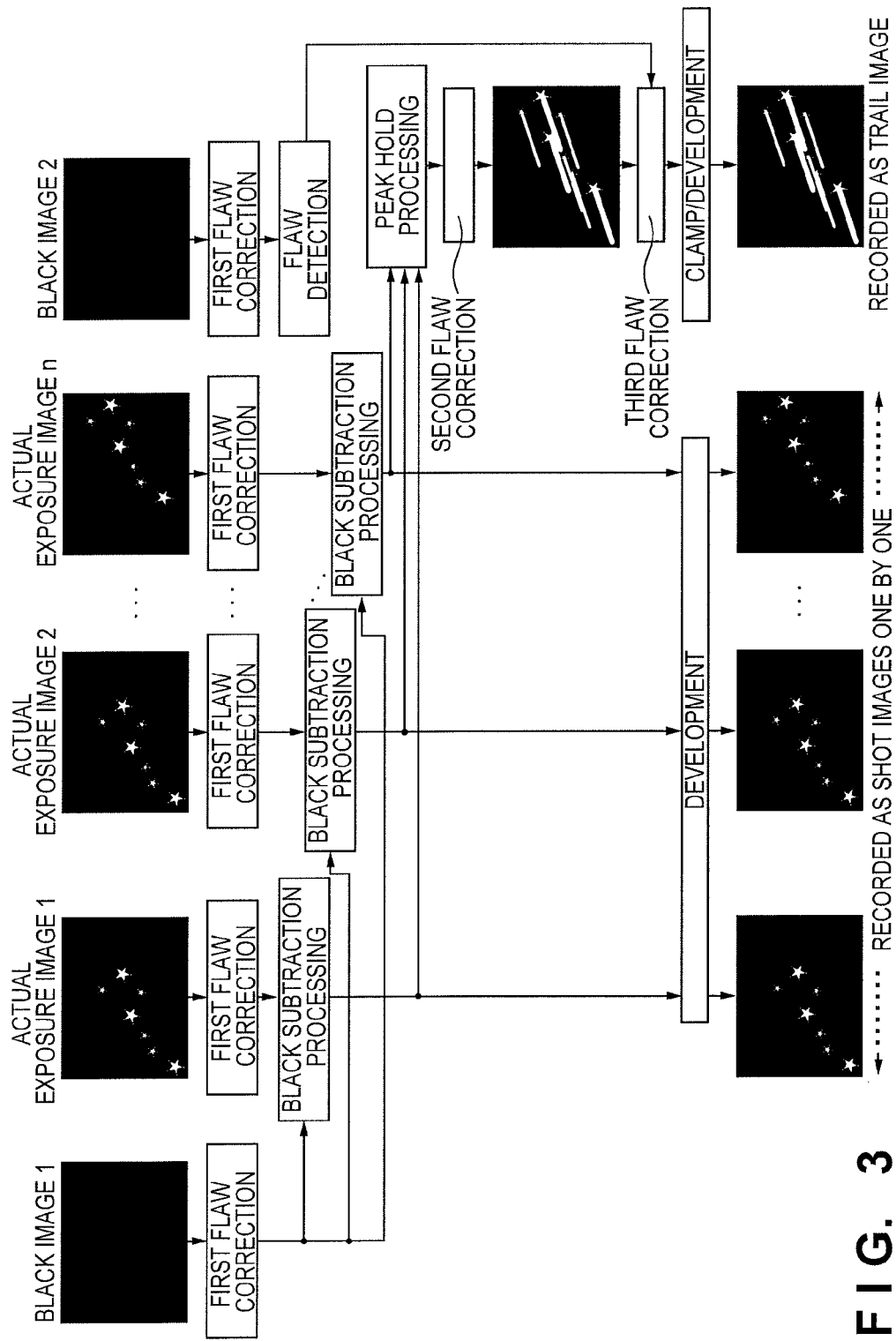
FIG. 3 is a view showing an outline of signal processing for an image according to the first embodiment.

FIG. 3 is a view showing an outline of how the images shot in FIG. 2 undergo image signal processing and are composed. Black image 1, actual exposure image 1 to actual exposure image n, and black image 2 in FIG. 3 are identical to the images of the same names in FIG. 2.

Clamp processing is performed for the shot images (black image 1, actual exposure images 1 to n, and black image 2) so as to set the OB level of each image to a predetermined value. First flaw correction processing is further executed for each image. This first flaw correction processing is performed to perform flaw correction for each image based on flaw information stored in the memory in advance. In this case, the flaw information stored in the memory in advance is information concerning the address, defect level, and the like of a defective pixel in the image sensor 106 which is detected from the image shot under predetermined conditions. Subsequently, black subtraction processing of subtracting black image 1 from each of the respective actual exposure images (actual exposure image 1, actual exposure image 2, . . . , actual exposure image n) is performed. Each actual exposure image having undergone black subtraction processing is directly developed and stored as an in-progress starlit sky image.

On the other hand, peak hold processing is executed for each actual exposure image having undergone the above black subtraction processing. Peak hold processing is executed every time an actual exposure image is shot, and second flaw correction processing is also executed every time peak hold processing is executed. Second flaw correction processing is performed to detect a flaw pixel (a defective pixel in the image sensor 106) from an image having undergone peak hold processing and perform flaw correction for each image based on information concerning the detected flaw pixel. For the image having undergone peak hold processing and second flaw correction processing for all the actual exposure images, third flaw correction processing is further executed based on the flaw information detected from black image 2. The third flaw correction processing is performed to detect a flaw pixel (a defective pixel in the image sensor 106) from black image 2 and perform flaw correction for each image based on information concerning the detected flaw pixel. Clamp processing and developing processing are further performed and the resultant image is stored as a star trail image.

The shooting sequence and signal processing in FIG. 3 will be described in detail with reference to FIGS. 4A to 9.

Figure 4A:
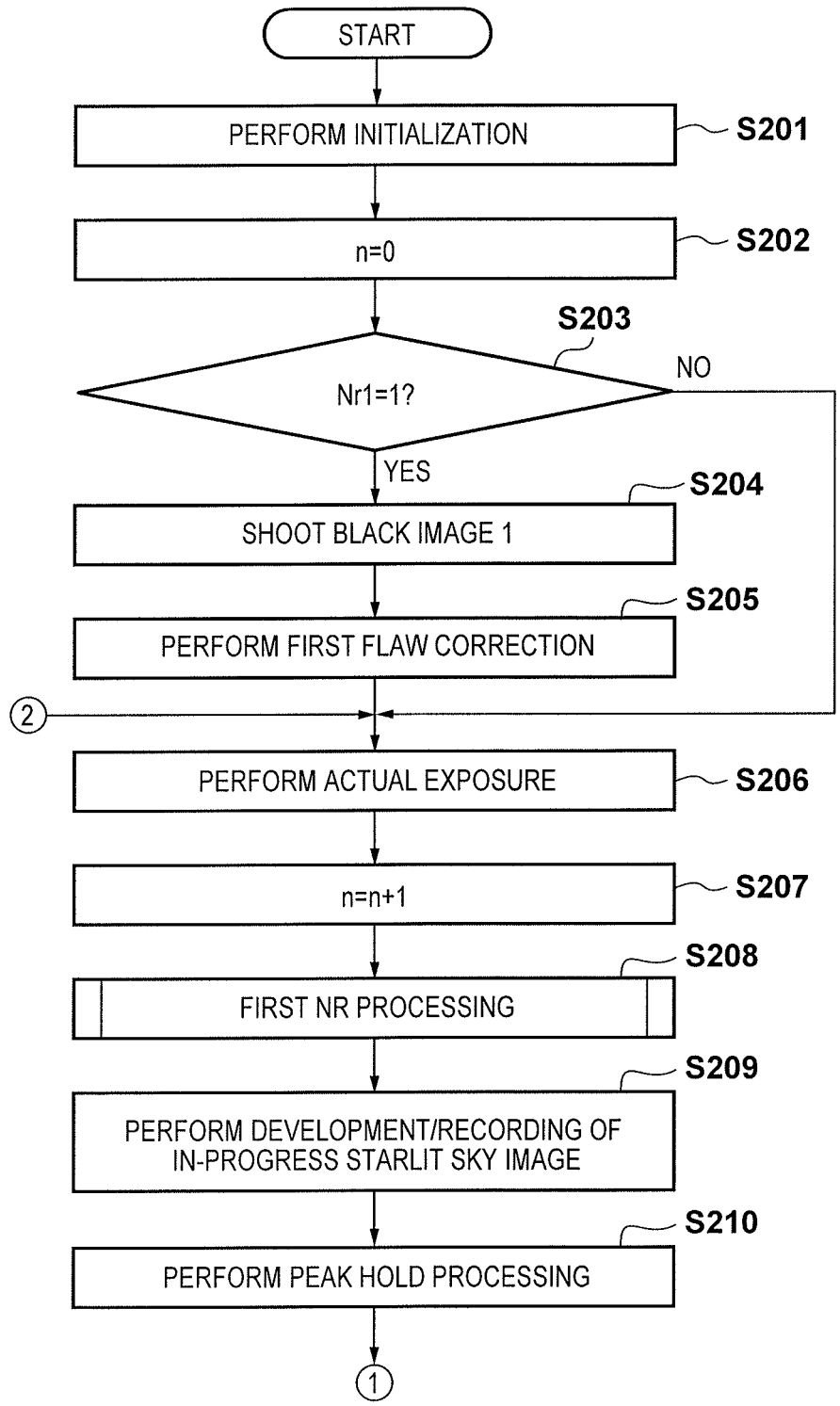
FIGS. 4A and 4B are flowcharts showing a shooting sequence according to the first embodiment.
Figure 4B:
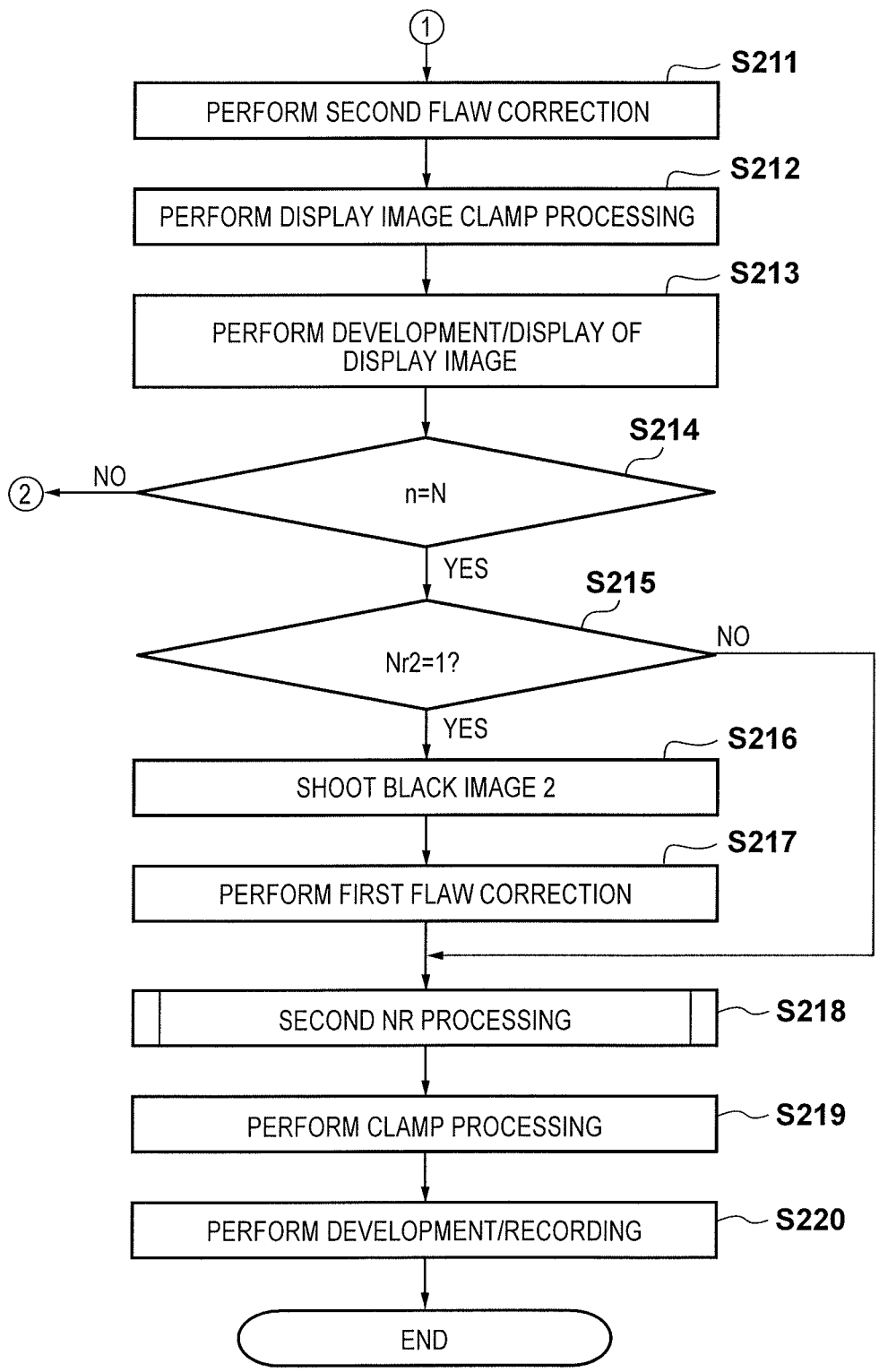

FIGS. 4A and 4B are flowcharts showing a shooting sequence and signal processing in the star trail mode in this embodiment. When actual exposure shooting is to be performed, an exposure time Tv per image, an aperture value Av, an ISO sensitivity G, and a time Tall for overall shooting operation of shooting star trails are stored in the second memory unit 116 in advance based on the settings input by the user with the operation unit 117.

In step S201, the overall control computation unit 111 initializes various types of parameters based on the settings input by the user with the operation unit 117. At this time, the apparatus calculates a total number N of images to be shot, in the following manner, from the exposure time Tv (time interval) per image and the time Tall for the overall shooting operation of shooting star trails, which are read out from the second memory unit 116.

$$N=\text{Tall}/Tv \quad (1)$$

The initialized parameters and the calculated total number N are recorded in the second memory unit 116.

In step S202, a shot image count coefficient n is reset to 0. In step S203, the overall control computation unit 111 controls to read out, from the second memory unit 116, the shooting conditions (Tv, Av, G) and temperature information t of the image sensor 106 measured by the thermometer 118. It is then determined, from the readout shooting conditions (Tv, Av, G) and the temperature information t, whether black image 1 is to be shot, based on the reference table in FIG. 5.

FIG. 5 shows a table of flags Nr1 for determining whether to shoot black image 1 based on the temperature t of the image sensor 106, the exposure time Tv at the time of shooting, and the ISO sensitivity G at the time of shooting. If the black image 1 shooting determination flag Nr1 is "0", black image 1 is not shot. If the black image 1 shooting determination flag Nr1 is "1", black image 1 is shot.

This table is generated by extracting conditions under which fixed pattern noise becomes conspicuous, upon checking images shot in advance with various temperatures of the image sensor 106, exposure times, and ISO sensitivities. Under the conditions in which fixed pattern noise occurs, it is necessary to perform correction using black image 1, and hence Nr1 is set to "1". If no fixed pattern noise occurs, since it is not necessary to perform correction using black image 1, Nr1 is written as "0". If Nr1="1" in step S203, the process advances to step S204. If Nr1="0" in step S203, the process advances to step S206.

In step S204, the overall control computation unit 111 outputs a command to cause the image sensor 106 to perform shooting while the mechanical shutter 103 is closed, thereby acquiring black image 1. In this case, shooting is performed under the shooting conditions (Tv, G) read out from the second memory unit 116.

In step S205, black image 1 acquired in step S204 is stored in the first memory unit 110 upon having undergone flaw correction processing. The captured signal processing circuit 108 performs this flaw correction processing based on flaw information stored in the second memory unit 116 by extracting the position and level of a flaw and the like from an image shot in advance under predetermined conditions. The above flaw correction processing will be referred to as "first flaw correction processing" hereinafter.

In step S206, the overall control computation unit 111 outputs a command to cause the image sensor 106 to perform shooting while the mechanical shutter 103 is open. This shooting operation is performed under the shooting conditions (Tv, Av, G). In step S207, 1 is added to the shot image count coefficient n. In step S208, the overall control computation unit 111 outputs a command to cause the captured signal processing circuit 108 to execute the first NR processing (noise reduction processing and image processing).

Figure 6:
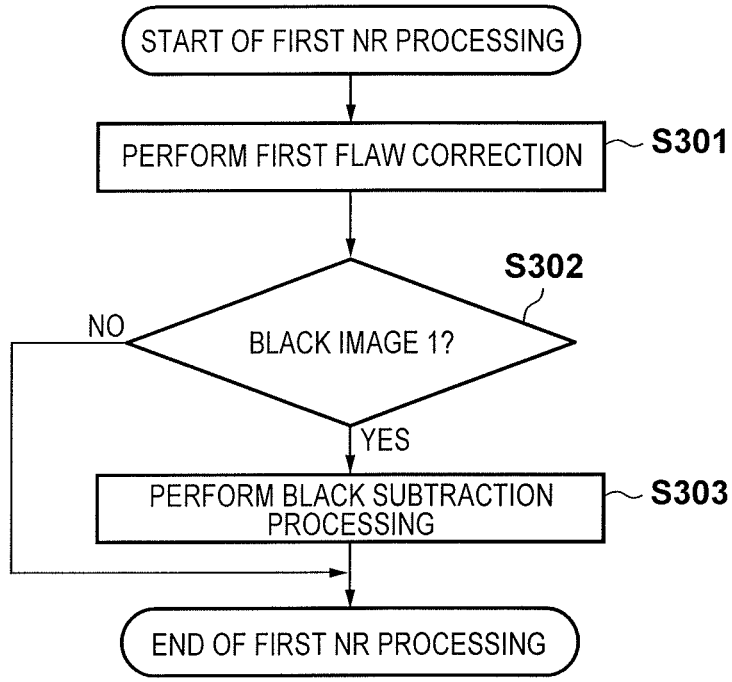
FIG. 6 is a flowchart showing first noise correction processing according to the first embodiment.

The first NR processing will be described in detail with reference to FIG. 6. FIG. 6 is a flowchart showing a procedure in the first NR processing.

In step S301, the overall control computation unit 111 outputs a command to cause the captured signal processing circuit 108 to execute the first flaw correction processing for the actual exposure image shot in step S206.

In step S302, the overall control computation unit 111 outputs a command to check whether black image 1 is stored in the first memory unit 110. If black image 1 is stored, the process advances to step S303. If black image 1 is not stored, the first NR processing is terminated.

In step S303, the overall control computation unit 111 outputs a command to cause the captured signal processing circuit 108 to read out black image 1 stored in the first memory unit 110. Black extraction processing is then executed for the actual exposure image having undergone the first flaw correction in step S301 by using black image 1, and the first NR processing is terminated. After the first NR processing, the process advances to step S209.

In step S209, the overall control computation unit 111 outputs a command to cause the captured signal processing circuit 108 to perform various types of image signal processing such as low-pass filter processing for noise reduction, shading processing, and WB processing, various types of correction, image data compression, and the like for the actual exposure image having undergone the first NR processing in step S208. The resultant image is recorded as an in-progress starlit sky image in the recording medium 114.

In step S210, the overall control computation unit 111 outputs a command to cause the captured signal processing circuit 108 to perform peak hold processing for the actual exposure image having undergone the first NR processing in step S208. In the peak hold processing, the captured signal processing circuit 108 performs the following processing.

Let An be an image shot as the nth actual exposure image in step S206. An is an output image from the image sensor 106 constituted by photoelectric conversion elements arranged in a two-dimensional matrix of k columns and m rows. Therefore, letting an (i, j) be an output value at an address (i, j) of An (where $1 \leq i \leq k$ and $1 \leq j \leq m$), an output of the actual exposure image An can be represented as a matrix:

$$An=(an(1,1),an(1,2),an(1,3),\ldots,an(i,j),\ldots,an(k,m)) \quad (2)$$

In addition, letting Pn be an image (to be referred to as a peak hold image hereinafter) obtained by performing peak hold processing for actual exposure images from a first actual exposure image A1 to the nth actual exposure image An, an output of the peak hold image Pn can also be represented as a matrix:

$$Pn=(pn(1,1),pn(1,2),pn(1,3),\ldots,pn(i,j),\ldots,pn(k,m)) \quad (3)$$

When n=1, no peak hold processing is performed. That is, P1 is given by $$P1=A1 \quad (4)$$

P1 is stored in the first memory unit 110.

When n>1, the overall control computation unit 111 outputs a command to read out Pn-1 from the first memory unit 110 and cause the captured signal processing circuit 108 to perform peak hold processing represented by the following equation. That is, the captured signal processing circuit 108 compares output values from all the pixels on the preceding peak hold image with those from all the pixels on a newly shot image at the same addresses, and sets larger output values as output values for a peak hold image.

$$P_n=\Sigma_{j=1}^{k}\Sigma_{i=1}^{m}\text{Max}(a_n(i,j),p_{n-1}(i,j)) \quad (5)$$

In step S211, the overall control computation unit 111 outputs a command to cause the captured signal processing circuit 108 to execute the second flaw correction processing for the peak hold image generated in step S210. A method of executing the second flaw correction processing will be described with reference to FIG. 7 and equations (6) to (10).

Figure 7:
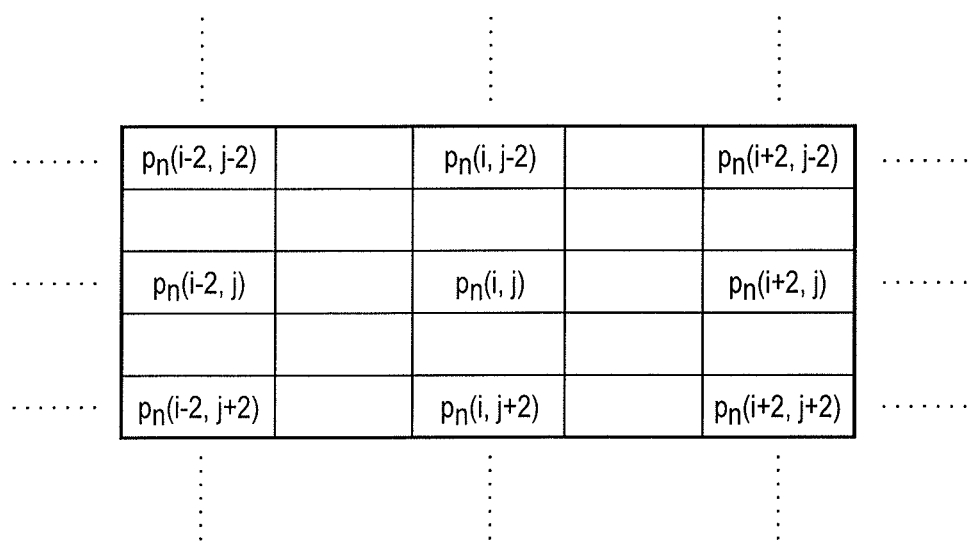
FIG. 7 is a view showing the arrangement of pixels used for flaw detection in second flaw correction.

Letting pn(i, j) in FIG. 7 be a target pixel, direction coefficients d1, d2, d3, and d4 are obtained from eight adjacent same color pixels pn(i−2, j−2), pn(i, j−2), pn(i+2, j−2), pn(i−2, j), pn(i, j), pn(i+2, j), pn(i−2, j+2), pn(i, j+2), and pn(i+2, j+2) in the following manner:

$$d1=(pn(i,j-2)+pn(i,j+2))/2 \quad (6)$$

$$d2=(pn(i-2,j)+pn(i+2,j))/2 \quad (7)$$

$$d3=(pn(i-2,j-2)+pn(i+2,j+2))/2 \quad (8)$$

$$d4=(pn(i+2,j-2)+pn(i-2,j+2))/2 \quad (9)$$

One of the direction coefficients d1 to d4 obtained above which has the minimum difference from pn(i, j) is selected as dmin. A difference Δd between dmin and pn(i, j) is calculated by $$\Delta d=|pn(i,j)-d\text{min}| \quad (10)$$

If Δd is larger than a predetermined threshold Th2, the target pixel pn(i, j) is detected as a flaw (defective pixel). Position information (i, j) of the detected pixel is extracted as flaw address information. The above flaw detection is performed for all pixels (pn(i, j), 1≤i≤k, 1≤j≤m) on the image Pn. Flaw correction processing is executed for the peak hold image based on the flaw address information detected in this manner (this flaw correction processing will be referred to as "second flaw correction processing" hereinafter).

As described above, in the second flaw correction processing, dmin, of the direction coefficients d1 to d4, which has the minimum difference from pn(i, j) is selected, and the value of dmin is compared with pn(i, j), thereby detecting a flaw. That is, in consideration of the shape of an image including a target pixel as a portion, a direction exhibiting high relevance with surrounding pixels is selected, and the target pixel is compared with each pixel existing in the direction, thereby detecting a flaw. This can reduce a deterioration in image quality caused by flaw correction. Pn is stored in the first memory unit 110.

In step S212, the captured signal processing circuit 108 performs clamp processing for the peak hold image having undergone the second flaw correction processing in step S211. In general, image data contains a certain amount of random noise component. When the same object is shot a plurality of times under the same conditions, random noise components take random values within a predetermined variation width. For this reason, the image data obtained by shooting the same object a plurality of times under the same conditions vary in output level as a whole by the variation width of such random noise components.

When peak hold processing is performed in step S210, the overall image is held at a relatively high value within the variation width of the random noise components contained in the image data, and hence the OB level also changes from the proper value. For the above reason, when peak hold processing is performed, the OB level needs to be adjusted again. This makes it necessary to perform clamp processing in step S212.

In step S213, the captured signal processing circuit 108 further performs various types of image signal processing such as low-pass filter processing for noise reduction, shading processing, and WB processing, various types of correction, image data compression, and the like. The generated image is used as a display image to be displayed on the display unit 113. In step S214, the number of images shot is checked. If shot image count coefficient n=N, the process advances to step S215. If n≠N, the process returns to step S206.

In step S215, the overall control computation unit 111 performs control to read out, from the second memory unit 116, a temperature T1 of the image sensor 106 measured by the thermometer 118 at the time of shooting the first actual exposure image, a temperature TN measured at the time of shooting the Nth actual exposure image, and the shooting conditions (Tv, G). A temperature change amount ΔT of the image sensor 106 from the start to the end of shooting actual exposure images is calculated from the temperature T1 and the temperature TN. It is determined, from ΔT and the shooting conditions (Tv, G), whether to shoot black image 2, based on the reference table in FIG. 8.

$$\Delta T=TN-T1 \quad (11)$$

FIG. 8 shows a table of flags Nr2 for determining whether to shoot black image 2 based on the temperature change amount ΔT of the image sensor 106 from the start to the end of shooting actual exposure images, the exposure time Tv at the time of shooting, and the ISO sensitivity G at the time of shooting. If the black image 2 shooting determination flag Nr2 is "0", black image 2 is not shot. If the black image 2 shooting determination flag Nr2 is "1", black image 2 is shot.

This table is generated by extracting conditions under which a change in fixed pattern noise becomes conspicuous, upon checking images shot in advance with various temperatures of the image sensor 106, exposure times, and ISO sensitivities. Under the conditions in which a change in fixed pattern noise becomes conspicuous, it is necessary to perform correction using black image 2, and hence Nr2 is set to "1". If a change in fixed pattern noise does not become conspicuous, since it is not necessary to perform correction using black image 2, Nr2 is set to "0". If Nr2="1" in step S215, the process advances to step S216. If Nr2="0" in step S215, the process advances to step S218.

Note that FIG. 8 is a table for determining whether to shoot black image 2, based on ΔT calculated from the temperature T1 at the time of shooting the first actual exposure image and the temperature TN at the time of shooting the Nth actual exposure image. However, it is possible to generate a table for making the above determination from the shooting conditions (Tv, G), the temperature TN, the shooting conditions (Tv, G), and a number N of images shot.

In step S216, the overall control computation unit 111 outputs a command to cause the image sensor 106 to perform shooting while the mechanical shutter 103 is closed, thereby acquiring black image 2. In this case, the image sensor 106 performs shooting under the shooting conditions (Tv, G) read out from the second memory unit 116.

In step S217, the captured signal processing circuit 108 executes the first flaw correction processing for black image 2 acquired in step S216. After the execution of the first flaw correction processing, black image 2 is stored in the first memory unit 110. In step S218, the overall control computation unit 111 outputs a command to cause the captured signal processing circuit 108 to execute the second NR processing.

Figure 9:
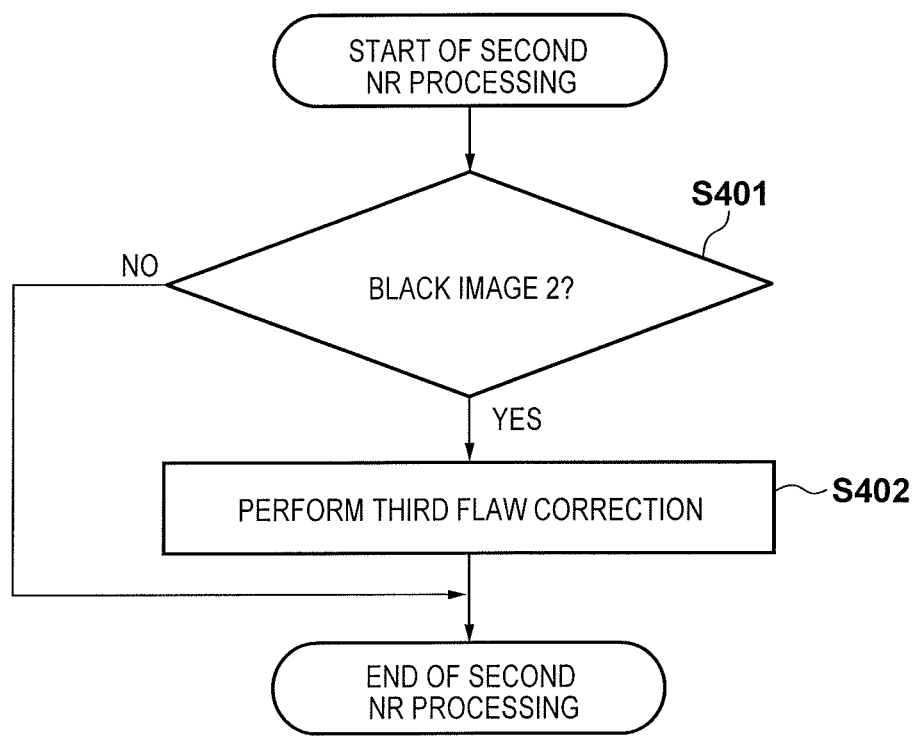
FIG. 9 is a flowchart showing second noise correction processing according to the first embodiment.

The second NR processing will be described in detail with reference to FIG. 9. FIG. 9 is a flowchart showing a procedure in the second NR processing.

In step S401, the overall control computation unit 111 outputs a command to check whether black image 2 is stored in the first memory unit 110. If black image 2 is stored in the first memory unit 110, the process advances to step S402. If black image 2 is not stored in the first memory unit 110, the second NR processing is terminated.

In step S402, the captured signal processing circuit 108 reads out black image 2 stored in the first memory unit 110, and detects a pixel whose output level is equal to or more than a predetermined threshold Th3 (equal to or more than a predetermined value). The position information of a detected pixel is extracted as flaw address information (flaw detection data). Flaw correction is further executed for the peak hold image having undergone the second flaw correction in step S211 based on this flaw address information. This flaw correction processing will be referred to as "third flaw correction processing" hereinafter. After the execution of the third flaw correction processing, the second NR processing is terminated. After the second NR processing is terminated, the process advances to step S219. When step S402 is executed, both the first NR processing and the second NR processing are executed.

In step S219, the captured signal processing circuit 108 further performs clamp processing. The reason why clamp processing is performed in step S219 is the same as that for clamp processing in step S212.

In step S220, the overall control computation unit 111 outputs a command to cause the captured signal processing circuit 108 to perform various types of image signal processing such as low-pass filter processing for noise reduction, shading processing, and WB processing, various types of correction, image data compression, and the like. The resultant image is recorded as a star trail image in the recording medium 114.

As described above, in this embodiment, it is possible to generate a high-quality star trail image with few flaws in the mode of composing a star trail image from a plurality of images shot by repeating long exposure for a long period of time.

In addition, in this embodiment, noise reduction processing is performed for an output image as a star trail image as far as possible to obtain an image with maximum quality. However, a display image or in-progress starlit sky image depicting the process of composing star trails can be displayed in real time by performing noise reduction processing at a possible level at the time.

Second Embodiment

The second embodiment of the present invention will be described below. According to the first embodiment, it is possible to obtain a high-quality star trail image by executing the third flaw correction processing for a peak hold image generated by composition. However, the third flaw correction processing is not executed for N in-progress starlit sky images acquired in the process of generating a star trail image. For this reason, more and larger flaws are left in in-progress starlit sky images with the lapse of time from the start time of shooting in the star trail mode (in-progress starlit sky images nearer to the Nth image) and with rises in temperature in a shooting environment.

In the second embodiment, therefore, the third flaw correction processing is executed for N actual exposure images before composition to a star trail image, which are obtained by shooting an ever-changing starlit sky, as well as a peak hold image by using black image 2 shot at the end of continuous shooting, unlike in the first embodiment in which the third flaw correction processing is executed only for a peak hold image.

The second embodiment of the present invention will be described below with reference to FIGS. 1 and 5 to 10B. The arrangement of an image capturing apparatus according to this embodiment is the same as that in FIG. 1 in the first embodiment, and hence a description of the arrangement will be omitted. In addition, the first NR processing and the second NR processing are totally the same as those shown in FIGS. 6 and 9 described in the first embodiment, and hence a description of the processing will be omitted. A method of executing the second flaw correction processing is the same as that described with reference to FIG. 7 in the first embodiment, and hence a description of the method will be omitted.

A procedure in a shooting sequence in the second embodiment of the present invention will be described below with reference to FIGS. 10A and 10B.

Figure 10A:
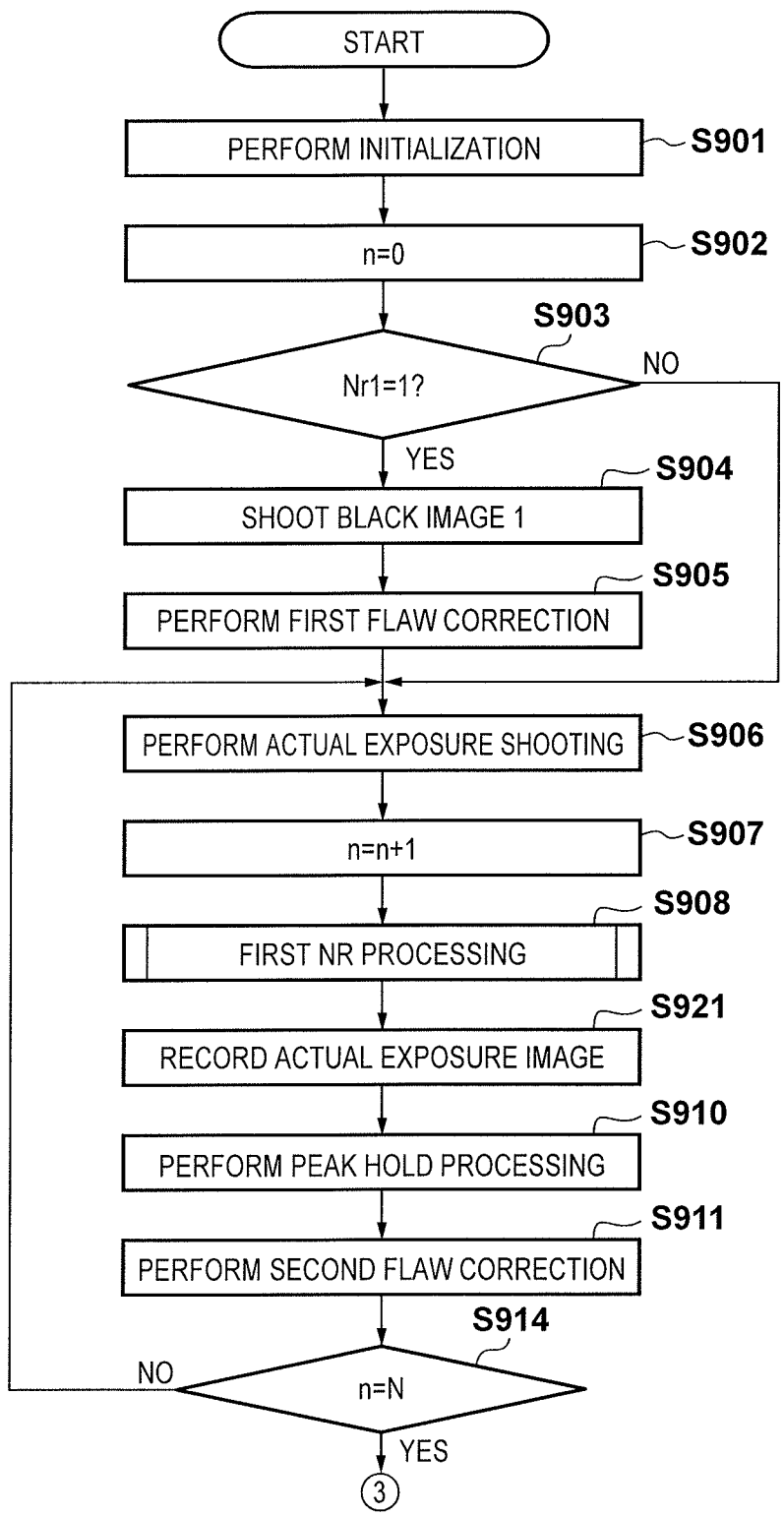
FIGS. 10A and 10B are flowcharts showing a shooting sequence according to the second embodiment.
Figure 10B:
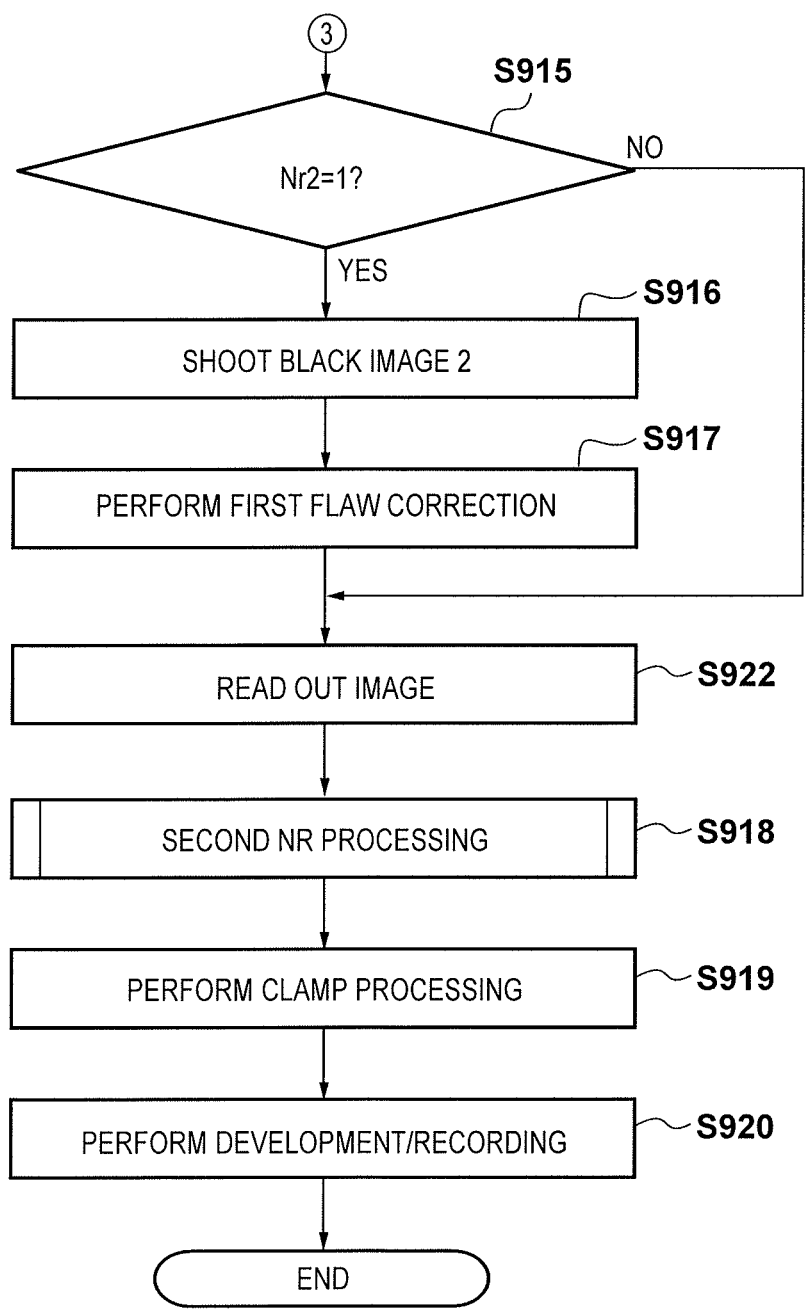

The processing in steps S901 to S908, S910, S911, S914, S916, and S917 in FIGS. 10A and 10B is totally the same as that in steps S201 to S208, S210, S211, S214, S216, and S217 in FIGS. 4A and 4B, and hence a description of the processing will be omitted. The reference table shown in FIG. 5 which is referred to in step S903 is totally the same as that described in the first embodiment, and hence a description of the table will be omitted.

In step S921, an actual exposure image having undergone the first NR processing in step S908 is stored in a first memory unit 110. In step S915, an overall control computation unit 111 performs control to read out, from a second memory unit 116, a temperature T1 of an image sensor 106 measured by a thermometer 118 at the time of shooting the first actual exposure image, a temperature TN measured at the time of shooting the Nth actual exposure image (at the end of shooting), and shooting conditions (Tv, G). A temperature change amount ΔT of the image sensor 106 from the start to the end of shooting is calculated from the temperature T1 and the temperature TN according to equation (11). It is then determined, from a condition that ΔT is equal to or less than a predetermined value and the shooting conditions (Tv, G), whether to shoot black image 2, based on the reference table in FIG. 8. Note that the details of the reference table shown in FIG. 8, which is referred to in step S915, are the same as those in the first embodiment, and hence a description of the details will be omitted.

If Nr2="1" in step S915, the process advances to step S916. If Nr2="0" in step S915, the process advances to step S922. In step S922, the N actual exposure images having undergone the first NR processing in step S908 stored in the first memory unit 110 in step S921 are read out.

The processing in each of steps S918, S919, and S920 is the same as that described in each of steps S218, S219, and S220 in FIG. 4. Although the processing in each of steps S218, S219, and S220 is performed only for a peak hold image, the processing in each of steps S918, S919, and S920 is performed not only for the peak hold image but also for the N actual exposure images read out in step S922.

As described above, in this embodiment, in the mode of composing a plurality of images shot by repeating long exposure for a long period of time into a star trail image, it is possible to generate, as high-quality images with few flaws, not only the star trail image generated by composing actual exposure images but also the N in-progress starlit sky images acquired in the process of generating the star trail image.

Third Embodiment

The third embodiment of the present invention will be described below. In the first embodiment, it is possible to obtain a high-quality star trail image by executing the third flaw correction processing for a peak hold image. However, depending on the characteristics of an image sensor, fixed pattern noise such as dark shading as well as a flaw occurs. Such noise sometimes becomes a factor that causes a deterioration in the image quality of a star trail image.

In the third embodiment, therefore, not only the third flaw correction processing but also dark shading correction processing is performed in signal processing in the second NR processing executed for a peak hold image in the first embodiment.

The third embodiment of the present invention will be described below with reference to FIGS. 1, 4A to 8, and 11. Since the arrangement of an image capturing apparatus according to this embodiment is the same as that shown in FIG. 1 in the first embodiment, a description of the arrangement will be omitted. In addition, a procedure in a shooting sequence is the same as that described with reference to FIGS. 4A and 4B in the first embodiment, and hence a description of the procedure will be omitted. Furthermore, since the first NR processing is totally the same as that described with reference to FIG. 6 in the first embodiment, a description of the processing will be omitted. The reference table shown in FIG. 5 which is referred to in step S203 and the reference table shown in FIG. 8 which is referred to in step S215 are totally the same as those described in the first embodiment, and hence a description of the tables will be omitted. The method of executing the second flaw correction processing is totally the same as that described with reference to FIG. 7 in the first embodiment, and hence a description of the method will be omitted.

Figure 11:
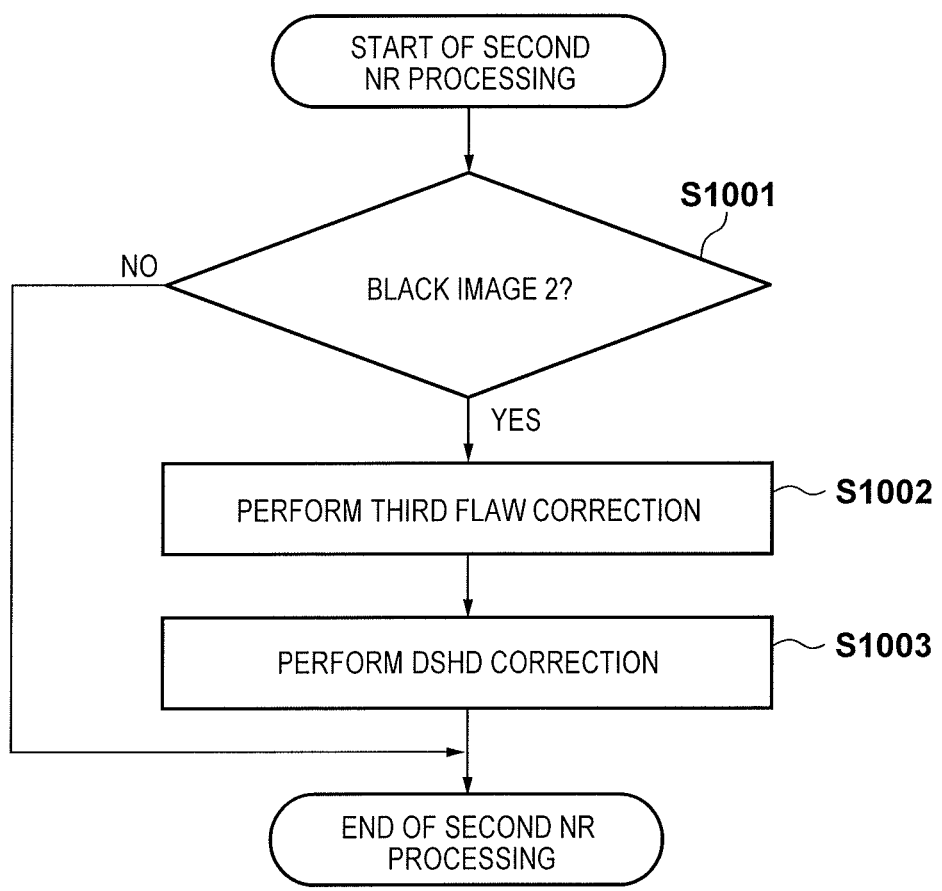
FIG. 11 is a flowchart showing second noise correction processing according to the third embodiment.
Figure 12:
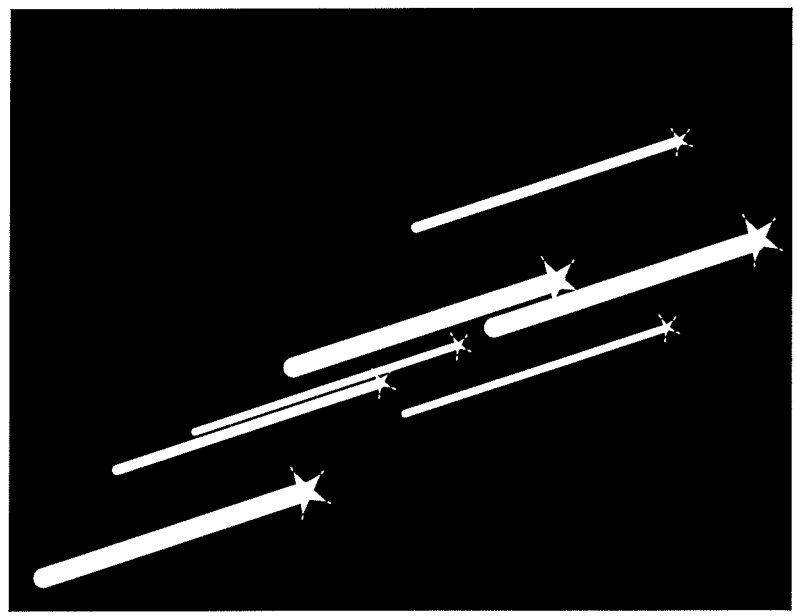
FIG. 12 is a view showing a star trail image depicting the trails of stars moving in the night sky.
Figure 13:
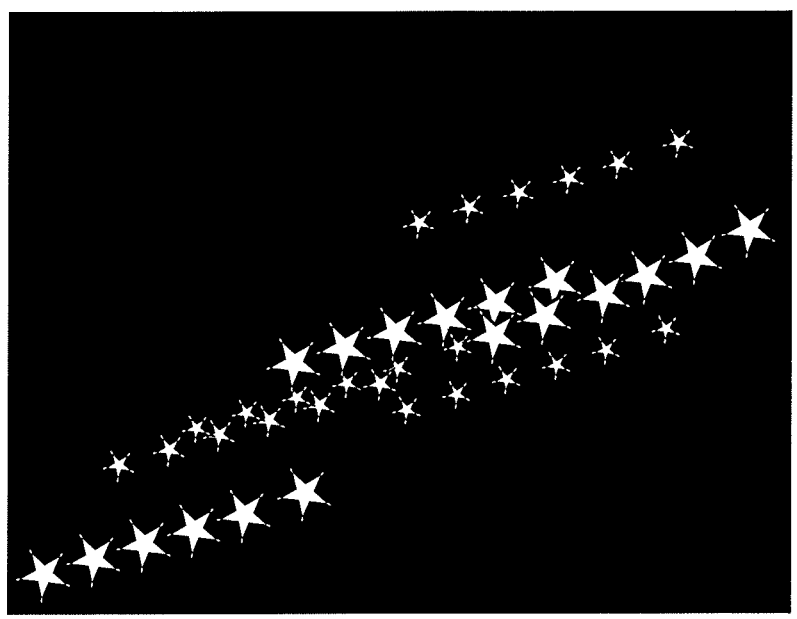
FIG. 13 is a view showing an example of failure of a star trail image depicting the trails of stars moving in the night sky.

A procedure in signal processing in the second NR processing in the third embodiment of the present invention will be described below with reference to FIG. 11.

In step S1001, an overall control computation unit 111 outputs a command to check whether black image 2 is stored in a first memory unit 110. If black image 2 is stored, the process advances to step S1002. If black image 2 is not stored, the second NR processing is terminated.

In step S1002, a captured signal processing circuit 108 reads out black image 2 stored in the first memory unit 110, and executes the third flaw correction processing for a peak hold image by using black image 2. The process then advances to step S1003.

In step S1003, the captured signal processing circuit 108 reads out black image 1 (B1) and black image 2 (B2) stored in the first memory unit 110, and executes low-pass filter processing for black image 1 (B1) and black image 2 (B2). In addition, the captured signal processing circuit 108 generates a dark shading correction image DshdI (dark shading amount) from black image 1 (B1) and black image 2 (B2) by performing the processing represented by the following equations. If there is no black image 1 (B1), DshdI=B2.

$$DshdI = \sum_{j=1}^{k} \sum_{i=1}^{m} \text{Max}(b_1(i,j), b_2(i,j)) \quad (12)$$

for $$B1 = (b1(1,1), b1(1,2), b1(1,3), \ldots, b1(i,j), \ldots, b1(k,m)) \quad (13)$$

$$B2 = (b2(1,1), b2(1,2), b2(1,3), \ldots, b2(i,j), \ldots, b2(k,m)) \quad (14)$$

A dark shading component is removed by subtracting DshdI described above from the peak hold image having undergone the third flaw correction processing in step S1002, and the second NR processing is terminated. After the second NR processing is terminated, the process advances to step S219.

As described above, in this embodiment, it is possible to generate a high-quality star trail image with little fixed pattern noise such as flaws and dark shading in the mode of composing a star trail image from a plurality of images shot by repeating long exposure for a long period of time.

In addition, in this embodiment, noise reduction processing is performed for an output image as a star trail image as far as possible to obtain an image with maximum quality. However, a display image or in-progress starlit sky image depicting the process of composing star trails can be displayed in real time by performing noise reduction processing at a possible level at the time.

Fourth Embodiment

The fourth embodiment of the present invention will be described below. In the second embodiment, it is possible to obtain a high-quality star trail image and high-quality in-progress starlit sky images by performing the third flaw correction processing for a peak hold image and N actual exposure images. However, depending on the characteristics of an image sensor, fixed pattern noise such as dark shading as well as a flaw occurs. Such noise sometimes becomes a factor that causes a deterioration in the image quality of a star trail image and in-progress starlit sky images.

In the fourth embodiment, therefore, not only the third flaw correction processing but also dark shading correction processing is performed in signal processing in the second NR processing executed for a peak hold image and N actual exposure images in the second embodiment.

The fourth embodiment of the present invention will be described below with reference to FIGS. 1, 5 to 8, 10A, 10B, and 11.

Since the arrangement of an image capturing apparatus according to this embodiment is the same as that shown in FIG. 1 in the first embodiment, a description of the arrangement will be omitted. A procedure in a shooting sequence in the fourth embodiment is the same as that described with reference to FIG. 10 in the second embodiment, and hence a description of the procedure will be omitted. Since the first NR processing is totally the same as that described with reference to FIG. 6 in the second embodiment, a description of the processing will be omitted. The reference table shown in FIG. 5 which is referred to in step S903 and the reference table shown in FIG. 8 which is referred to in step S915 are totally the same as those described in the second embodiment, and hence a description of the tables will be omitted. The method of executing the second flaw correction processing is totally the same as that described with reference to FIG. 7 in the first embodiment, and hence a description of the method will be omitted.

A procedure of signal processing in the second NR processing in the fourth embodiment of the present invention will be described below with reference to FIG. 11.

In step S1001, an overall control computation unit 111 outputs a command to check whether black image 2 is stored in a first memory unit 110. If black image 2 is stored, the process advances to step S1002. If black image 2 is not stored, the second NR processing is terminated.

In step S1002, a captured signal processing circuit 108 reads out black image 2 stored in the first memory unit 110, and executes the third flaw correction processing for N actual exposure images and a peak hold image by using black image 2. The process then advances to step S1003.

In step S1003, the captured signal processing circuit 108 reads out black image 1 (B1) and black image 2 (B2) stored in the first memory unit 110, and executes low-pass filter processing for black image 1 (B1) and black image 2 (B2). In addition, the captured signal processing circuit 108 generates dark shading correction images DshdI and DshdII(n) from black image 1 (B1) and black image 2 (B2) by performing the processing represented by the following equations. Note that 1≤n≤N and DshdII(1) to DshdII(N) represent dark shading correction images for the first shot actual exposure image to the Nth shot actual exposure image. DshdI is calculated in the same manner as represented by equation (12) in the third embodiment. DshdII(n) is calculated as follows.

If there is no black 1 (B1), DshdII(n) is calculated according to $$Dshd\ I = \sum_{j=1}^{k} \sum_{i=1}^{m} \text{Max}(b_1(i,j), b_2(i,j)) = 0$$

in place of B1.

$$DshdII(n)=B1\times(N-n)/N+B2\times n/N \quad (15)$$

for 1≤n≤N.

The captured signal processing circuit 108 removes dark shading components by subtracting, from the N actual exposure images having undergone flaw correction processing in step S1002, corresponding DshdII(n) (1≤n≤N), and subtracting DshdI described above from the peak hold image, and terminates the second NR processing. After the second NR processing is terminated, the process advances to step S919.

As described above, in this embodiment, it is possible to generate, as high-quality images with little fixed pattern noise such as flaws and dark shading, not only the star trail image generated by composing actual exposure images but also N in-progress starlit sky images generated in the process of generating the star trail image in the mode of composing a star trail image from a plurality of images shot by repeating long exposure for a long period of time.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-165587, filed Aug. 8, 2013, which is hereby incorporated by reference herein in its entirety.

What is claimed is:

1. An image capturing apparatus comprising:
   an image sensor including a plurality of pixels arranged two-dimensionally;
   a shutter that shields said image sensor from light;
   a controller that controls to perform continuous shooting of a plurality of exposure images by said image sensor and compose the plurality of exposure images obtained by the continuous shooting;
   the controller that controls to acquire a first black image before the continuous shooting by causing said image sensor to accumulate electric charges while said image sensor is shielded from light by said shutter and to acquire a second black image after the continuous shooting by causing said image sensor to accumulate electric charges while said image sensor is shielded from light by said shutter; and
   an image processing circuit that performs first noise reduction processing using the first black image for each of a plurality of exposure images obtained by the continuous shooting and performs second noise reduction processing using the second black image for an exposure image obtained by composing the plurality of exposure images by said controller.

2. The apparatus according to claim 1, wherein said image processing circuit performs black subtraction processing of subtracting a black image from an image as the first noise reduction processing.

3. The apparatus according to claim 1, wherein said image processing circuit performs, as the second noise reduction processing, dark shading correction of calculating a dark shading amount from the second black image and subtracting the calculated dark shading amount from an image obtained by composing the plurality of images.

4. The apparatus according to claim 3, wherein said image processing circuit calculates the dark shading amount from the first black image and the second black image.

5. The apparatus according to claim 1, wherein said image processing circuit does not capture the second black image and does not perform the second noise reduction processing if a difference between a temperature of said image sensor at the start of the continuous shooting and a temperature of said image sensor at the end of the continuous shooting is not more than a predetermined value.

6. The apparatus according to claim 1, wherein said image processing circuit does not capture the second black image and does not perform the second noise reduction processing if a temperature of said image sensor at the end of the continuous shooting is not more than a predetermined value.

7. The apparatus according to claim 1, wherein said image processing circuit does not capture the second black image and does not perform the second noise reduction processing if the number of images obtained by the continuous shooting is not more than a predetermined value.

8. The apparatus according to claim 1, wherein said image processing circuit does not capture the second black image and does not perform the second noise reduction processing if a time interval between a start time of the continuous shooting and an end time of the continuous shooting is not more than a predetermined value.

9. The apparatus according to claim 1, wherein said image processing circuit switches whether to capture the second black image and perform the second noise reduction processing, in accordance with an exposure time or sensitivity of said image sensor when performing the continuous shooting or a temperature of said image sensor at a start time of the continuous shooting.

10. The apparatus according to claim 1, wherein said image processing circuit switches whether to capture both the first black image and the second black image and perform both the first noise reduction processing and the second noise reduction processing, in accordance with an exposure time or sensitivity of said image sensor when performing the continuous shooting or a temperature of said image sensor at a start time of the continuous shooting.

11. The apparatus according to claim 1, wherein said image processing circuit detects a flaw with a value not less than a predetermined value from the second black image, and performs flaw correction processing for an image obtained by composing the plurality of images based on detection data of the flaw.

12. The apparatus according to claim 1, wherein said controller controls to perform composition processing for the plurality of images by peak hold processing.

13. A method of controlling an image capturing apparatus including an image sensor including a plurality of pixels arranged two-dimensionally and a light-shielding unit configured to shield the image sensor from light, the method comprising:

performing continuous shooting of a plurality of exposure images by the image sensor and composing the plurality of exposure images obtained by the continuous shooting;

performing control to acquire a first black image before the continuous shooting by causing the image sensor to accumulate electric charges while the image sensor is shielded from light by the light-shielding unit and to acquire a second black image after the continuous shooting by causing the image sensor to accumulate electric charges while the image sensor is shielded from light by the light-shielding unit; and performing first noise reduction processing using the first black image for each of a plurality of exposure images obtained by the continuous shooting and performing second noise reduction processing using the second black image for an exposure image obtained by composing the plurality of exposure images in the composition step.

* * * * *